United States Patent [19]

Gallacher

[11] Patent Number: 4,719,363

[45] Date of Patent: Jan. 12, 1988

[54] SYSTEM FOR AUTOMATICALLY CONTROLLING LIGHTS IN A ROOM

[76] Inventor: Douglas L. Gallacher, P.O. Box 6569, Crestline, Calif. 92325

[21] Appl. No.: 34,395

[22] Filed: Apr. 3, 1987

[51] Int. Cl.$^4$ .......................................... H05B 37/02
[52] U.S. Cl. ..................... 307/117; 307/115; 307/116; 307/140; 200/61.62; 340/556; 340/555; 250/221
[58] Field of Search .............. 307/112, 113, 114, 115, 307/116, 117, 118, 132 E, 132 R, 140; 340/545, 547, 551, 552, 555, 556, 557, 561, 562, 565, 566, 567, 571, 572; 200/61.02, 61.64, 61.67, 61.68, 61.62; 315/155, 159; 250/221, 209; 361/173–179, 181

[56] References Cited

U.S. PATENT DOCUMENTS

| | | | |
|---|---|---|---|
| 3,790,945 | 2/1974 | Fearon | 340/572 |
| 4,009,389 | 2/1977 | Lindholm | 250/221 |
| 4,023,151 | 5/1977 | Markham | 340/545 X |
| 4,101,886 | 7/1978 | Grimes et al. | 307/140 X |
| 4,213,063 | 7/1980 | Jones | 307/140 X |
| 4,272,762 | 6/1981 | Geller et al. | 340/556 |
| 4,277,727 | 7/1981 | LeVere | 340/556 X |
| 4,305,006 | 12/1981 | Walthall et al. | 307/115 X |
| 4,315,596 | 2/1982 | Johnson et al. | 200/61.62 X |
| 4,391,406 | 7/1983 | Fried | 200/61.62 X |
| 4,465,369 | 8/1984 | Saegusa et al. | 250/209 X |

Primary Examiner—William M. Shoop, Jr.
Assistant Examiner—Paul Ip
Attorney, Agent, or Firm—Klein & Szekeres

[57] ABSTRACT

A system for automatically controlling lighting fixtures, appliances, an alarm, or the like in a room or enclosure has a pair of sensors installed in association with each entryway leading into a room. The sensors are triggered when a person passes through the entryway and send a signal to a logic circuit which is mounted in operative association with the sensors. The logic circuit distinguishes between entry or exit of persons from the room on the basis that in each entryway or door one of the two sensors is triggered first in case of entry, and the other one of the two sensors is triggered first in case of exit. The signals signalling entry are counted and stored in a first counting register separately from the signals signalling exit of persons from the room which are counted in a second counting register. The status of the first counting register storing the number of entries is continuously compared in a comparator circuit to the status of the second counting register storing the number of exits. An output signal generated by the comparator circuit as a result of this comparison controls a switching circuit which switches a lighting fixture, alarm, or like electric appliance on or off.

21 Claims, 5 Drawing Figures

SYSTEM FOR AUTOMATICALLY CONTROLLING LIGHTS IN A ROOM

BACKGROUND OF THE INVENTION

1. Field of the Invention

The present invention is directed to a system and device for automatically controlling lights or appliances in a room. More particularly, the present invention is directed to a system and device which keeps track of the number of persons who have entered and exited from a room, and which turns an electric light or appliance off only when the number of persons who have exited equals the number of persons who have entered.

2. Brief Description of the Prior Art

Various types of electric timing devices are used in the art for controlling lights in households. The timers may, for example, be set to switch a light on and off at predetermined times every day.

Various types of sensors and associated electric and logic circuits are also known in the art to be used as burglar alarms, that is, for the detection of unauthorized entry by persons into an enclosure. The senors for burglar alarms work on a wide variety of physical principles. For example, some burglar alarms utilize photoelectric sensors (electric eyes) while others use motion sensors or infrared detectors, and still others use pressure sensors mounted into floors, to detect unauthorized entry.

In spite of the relative sophistication of the prior art technology for detecting unauthorized entry into a building or enclosure, as far as the present inventor knows there are no simple and inexpensive devices in the prior art designed for controlling a light or electric appliance in a room or enclosure simply on the basis whether or not the number of persons who have entered the room equals the number of persons who have left a room. The present invention provides such a device.

SUMMARY OF THE INVENTION

It is an object of the present invention to provide a system and device for keeping track whether or not the number of persons who have entered a room is the same as the number of persons who have left the room, and to control a lighting fixture or electrical appliance on that basis.

It is another object of the present invention to provide a system and device which meets the above-noted objective and which is relatively inexpensive to manufacture and can be readily installed in existing homes or buildings.

It is still another object of the present invention to provide a system and device which meets the above-noted objectives and which can also be readily utilized for activating an alarm to signal the entry of an intruder into a room or building.

The foregoing objects and advantages are attained by a system or device which has a pair of sensors installed in association with each entryway or door leading into a room. The sensors are triggered when a person passes through the entryway and send a signal to a logic circuit which is mounted in operative association with the sensors. The logic circuit distinguishes between entry or exit of persons from the room on the basis that in each entryway or door one of the two sensors is triggered first in case of entry, and the other one of the two sensors is triggered first in case of exit. The signals signalling entry are counted and stored in a first counting register separately from the signals signalling exit of persons from the room which are counted in a second counting register. The status of the first counting register storing the number of entries is continuously compared in a comparator circuit to the status of the second counting register storing the number of exits. An output signal generated by the comparator circuit as a result of this comparison controls a switching circuit which switches a lighting fixture, alarm, or like electric appliance on or off.

The features of the present invention, which are believed to be novel, can be best understood together with further objects and advantages, by reference to the following description, taken in connection with the accompanying drawings.

DESCRIPTION OF THE PREFERRED EMBODIMENTS

The following specification taken in connection with the drawings sets forth the preferred embodiments of the present invention. The embodiments of the invention disclosed herein are the best modes contemplated by the inventor for carrying out his invention in a commercial environment, although it should be understood that several modifications can be accomplished within the parameters of the present invention.

Figure 1:
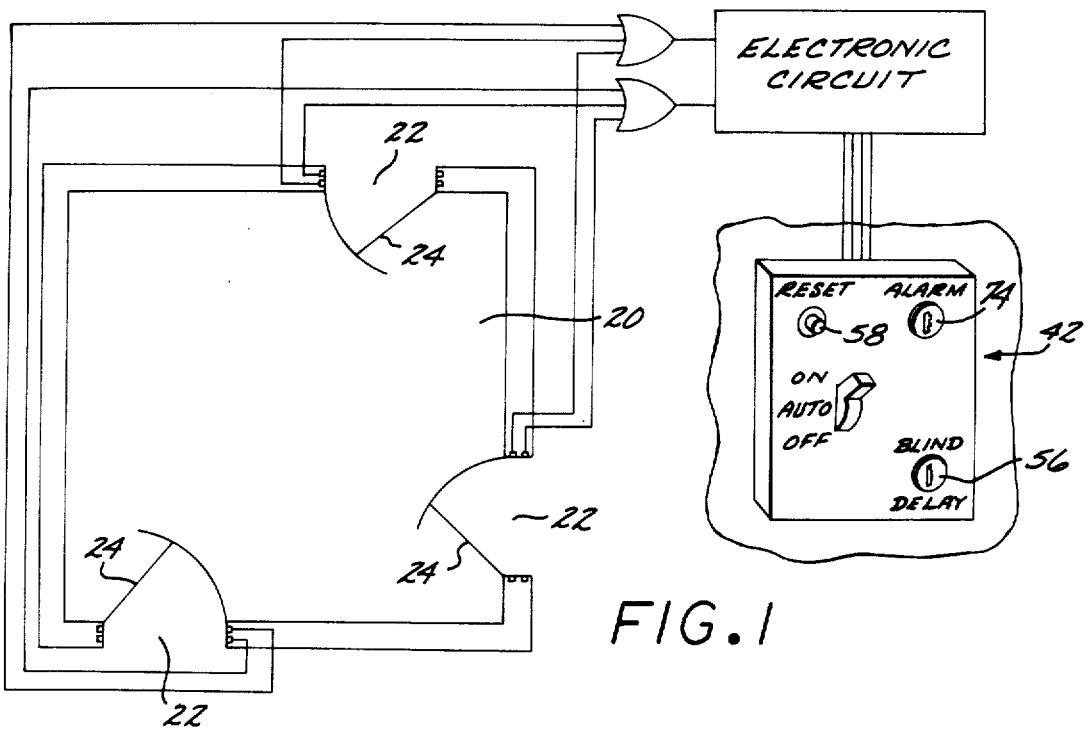
FIG. 1 is a schematic representation of a first preferred embodiment of the light control system of the present invention.

Referring now to the drawing Figures, the lighting fixture or appliance control system of the present invention is disclosed in detail. FIG. 1 schematically shows a room or enclosure 20 having three entryways or doorways 22. It should be understood in this regard that the light or appliance control system of the present invention may be used in connection with any type of room or enclosure regardless of how many entryways or doorways 20 lead into the room 20. What is important in this connection is that suitable sensors which are described in detail below, are installed in association with each doorway 22 or entryway. In some instances, however, it may be desirable to omit installation of the sensors for one specific doorway, either because the doorway is not normally used for entry or exit into the room, or because for some reason it is not desired to monitor traffic into the room 20 through that doorway. In light of the foregoing, the ensuing description with reference to the room 20, shown on FIG. 1 and having three doorways 22 and three doors 24, should be construed as exemplary rather than limiting in nature.

Figure 2:
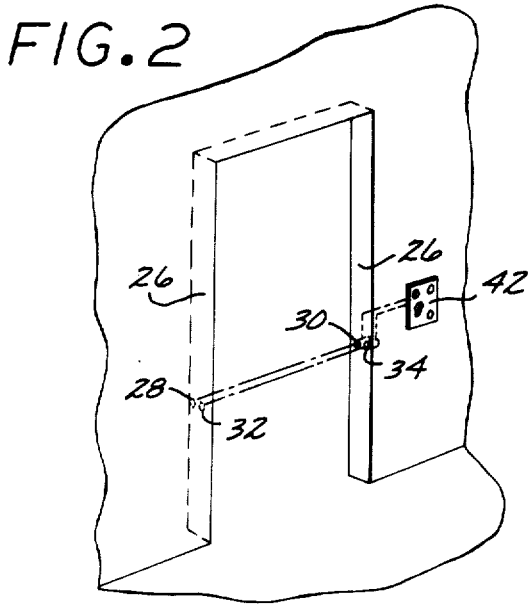
FIG. 2 is a schematic representation, in perspective view, of a photoelectronic sensor used in the first preferred embodiment of the light control system of the present invention.

Referring now principally to FIGS. 1 and 2, the sensors are shown mounted in association with each doorway 22. The sensors monitor traffic through the doorway 22. More specifically, the sensors of the first preferred embodiment comprise photocells and corresponding light sources which are mounted into the doorjam 26 so as not to be interfered with by the door 24. A first light source 28 provides a continuous light beam to its corresponding first photocell 30, whereas a second light source 32 provides a continuous light beam to the second photocell 34. Each light source paired up with the corresponding photocell is considered in the broad sense as one photoelectric sensor. The photocells and corresponding light sources, per se, are old in the art, are commercially available, and as is known, may operate with visible light or infrared light. The photocells 30 and 34, the light sources 28 and 32, as well as the other components of the light control system of the present invention, are preferably powered by low voltage, for example, by alternating or direct current of 6 to 24 volts. Such low voltage may be readily obtained from batteries or preferably from ordinary household current through the use of a step-down transformer (not shown) and/or rectifier (not shown). The photocells 30 and 32 are designed in accordance with the state of the art to provide an electric signal, such as pulse of voltage, whenever the light beam is interrupted.

In accordance with the present invention, the light sources 28 and 32, and the corresponding photocells 30 and 34, are mounted in the doorjam 26 in such positions that when a person (not shown) walks into the room 20 the light beam of the first light source 28 is interrupted first. Conversely, when a person (not shown) exits from the room 20 the light beam of the second light source 32 is interrupted first. Accordingly, when a person (not shown) enters the room 20, the first sensor outputs a first electric signal, and this is followed within a few seconds or less by the second sensor outputting a second electric signal. The converse occurs when a person (not shown) exits from the room 20 through the doorway 22. In such a case, the second sensor outputs the second electric signal before the first sensor outputs the first signal.

Figure 3:
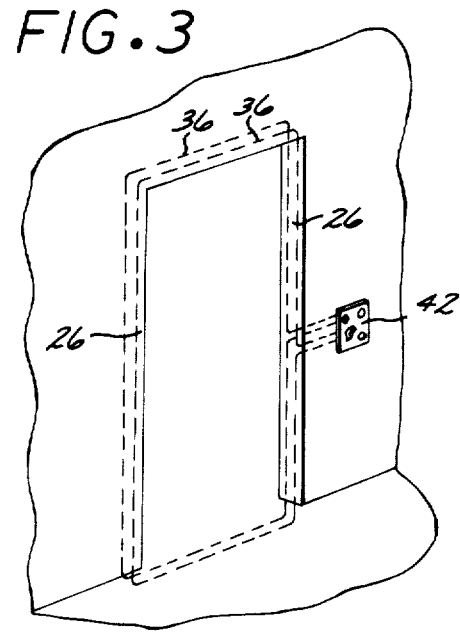
FIG. 3 is a schematic representation, in perspective view, of an electromagnetic sensor used in a second preferred embodiment of the light control system of the present invention.

Referring now to FIG. 3 of the appended drawings a second preferred embodiment of the sensors adapted for use in the light control system of the present invention is shown schematically. In accordance with the second preferred embodiment, each sensor comprises one or more loops or coils 30 of wire which are disposed around the doorway 22. The loop 36 of wire is powered by the relatively low voltage of the system and generates an electromagnetic field in the doorway. When a person (not shown) walks through the doorway 22, the person acts as a "core" for the loop 36 of wire and changes the characteristics of the electromagnetic field. This is detected by means known in accordance with the state of the art. For example, the temporary presence of a person (not shown) within the loop 36 of wire may cause a surge in the current flowing in the wire which, in turn, triggers an electric signal pulse to be inputted into the system. In accordance with the principles mentioned in connection with the first preferred embodiment, the wire loops 36 are positioned in the doorway 22 in such a manner that the loop comprising the first sensor is triggered first to provide the first electric signal when a person walks into the room 20.

Conversely, when a person exits from the room 20 through the doorway 22, the sensor comprising the second wire loop is triggered first in time, to provide a second electric signal. The second signal is followed in time by the first electric signal generated by the first loop.

In the following description and with reference to the sensors of all preferred embodiments, the first sensor which senses the entry of a person first in time, is sometimes referred to as the entry sensor, and the signal pulse generated by the first sensor is called the first electric signal or entry signal 38. Conversely, the second sensor is sometimes referred to as the exit sensor, and the signal pulse generated by the exit sensor is called the second electric signal or exit signal 40.

Figure 5:
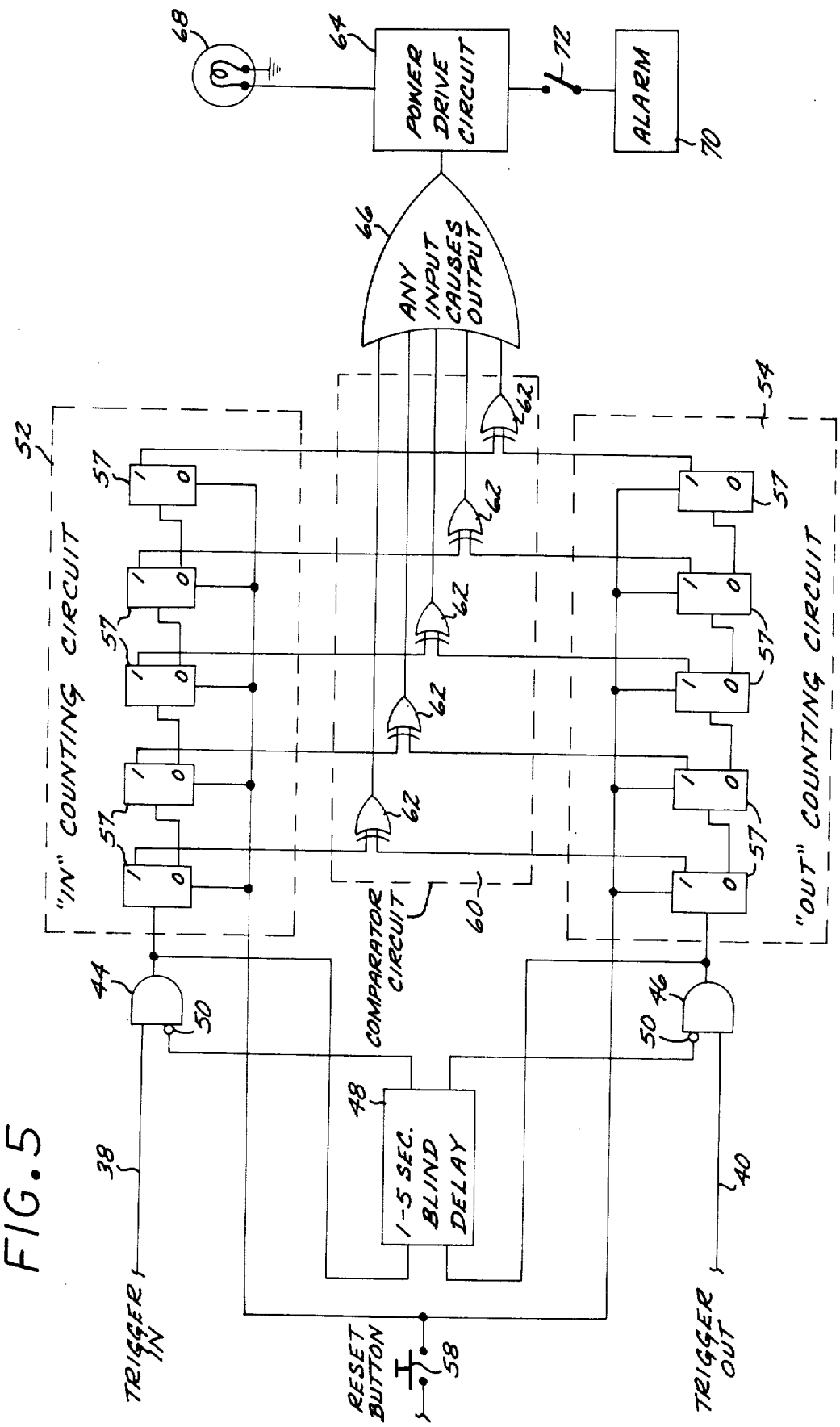
FIG. 5 is a block diagram of the first preferred embodiment of the light control system of the present invention.

Referring now principally to FIG. 5, a logic circuit comprising an integral part of the light control system of the present invention is shown. In the preferred embodiments the logic circuit is mounted into a relatively small control box 42 which is schematically shown on FIGS. 1-3. The control box 42 is preferably small enough so that it may be mounted into the wall cavity of an ordinary switch box (not shown) of the type which is virtually ubiquitous in every room of every home or building. The logic circuit may be built of individual circuit components which, per se, are known and commercially available. Alternatively, the logic circuit may comprise a microprocessor chip specifically adapted for this purpose.

As is shown on FIG. 5, the logic circuit includes a first AND gate 44 which is connected at its input terminal to all of the first or entry sensors which are utilized in the system. A second AND gate 46 of the logic circuit is connected at its input terminal to all of the second or exit sensors which are utilized in the system. In other words, the entry sensors "guarding" each doorway 22 of the room 20 lead to the input of the first AND gate 44, and the exit sensors of each doorway 22 lead to the input of the second AND gate 46.

Second inputs provided to the first AND gate 44 as well as to the second AND gate 46 come from a timer circuit 48 through signal converters 50. The timer circuit 48 itself normally has no output. The normal or "zero" output of the timer circuit 48 is therefore converted by the signal converters 50 to a positive signal which is thereafter inputted into the first and second AND gates 44 and 46. As is known, an AND gate requires two positive inputs to provide a positive output.

In light of the foregoing, the first and the second AND gates 44 and 46 normally have no output, because normally they each receive only one positive input from the signal converters 50. However, when a person (not shown) enters the room 20 the first sensor is triggered to provide the first signal 38 in the form of an electric pulse to the first AND gate 44. Thus, for the duration of the first signal 38 both inputs of the first AND gate 44 are positive and the first AND gate 44 outputs a positive signal pulse. The output of the first AND gate 44 is inputted into a first counting circuit or register 52 which is described in more detail below.

A similar event occurs in connection with the second AND gate 46 when a person (not shown) exits from the room 20. In such a case the second or exit sensor is triggered first, and the second AND gate 46 receives a positive exit signal pulse 40 from the second sensor. In response, the second AND gate 46 outputs a positive signal which is inputted into a second counting circuit or register 54.

The output of the first and second AND gates 44 and 46 also inputted into the timer circuit 48 to trigger the timer circuit 48 to provide a positive output for a relatively short duration of approximately 0.3 to 5 seconds. The timer circuit 48 itself is readily constructed in accordance with the state of the art. Preferably, the duration of the positive output of the timer circuit 48 is adjustable manually, for example, by turning a variable potentiometer. FIG. 1 indicates a control labelled BLIND/DELAY on the control box 42 and having a slot 56 for a screwdriver (not shown) which can turn the potentiometer (not shown) to manually adjust the timer circuit 48.

It should be apparent from the foregoing that during the approximately 0.3 to 5 second duration of the positive output of the timer circuit 48 the signal converters 50 provide zero input into the first and second AND gates 44 and 46. Accordingly, for this short time period the first and second AND gates 44 and 46 also have zero output regardless of the nature of the input received from the entry and exit sensors. In effect, the timer circuit 48 inactivates or "blinds" the system for about 0.3 to 5 seconds, and thus prevents the counting registers 52 and 54 from receiving any inputs to be counted and stored for about 0.3 to 5 seconds immediately after the entry or exit sensors are first triggered by a person passing through one of the doorways 22. The timer circuit 48, coupled with the signal converters 50 and first and second AND gates 44 and 46, in effect causes the system to discriminate between an entry and an exit, and count these events separately in separate counting registers. In alternate embodiments of the invention, a separate timer circuit is used for each AND gate 44 & 46. In such a case the system is blinded from counting entries or exits, only while the respective timer circuit is triggered by a person entering or exiting from the room.

Referring now to the first and second counting circuits or registers 52 and 54 shown on FIG. 5, these circuits can be readily constructed in accordance with the state of the art. They may comprise a plurality of flip-flop switches 57, or an integrated circuit which accomplishes the overall function of counting the number of pulses received from the respective first and second AND gates 44 and 46. The first counting register 52 thus stores the count of persons who have entered the room 20, whereas the second counting register 54 stores the count of persons who have exited from the room 20. Each counting register may be reset to zero through an appropriate state-of-the-art circuit which is activated by a RESET button 58 mounted in the control box 42. It is desirable in the context of the present invention that pressing the RESET button 58 should also trigger the timer circuit 48. This is desirable, because, after resetting the system, a user usually wishes to quickly leave the room 20 without wanting his exit to be sensed and stored in the registers 52.

Referring still principally to FIG. 5, a comparator circuit 60 is shown connected between the first and second counting registers 52 and 54. The function of the comparator circuit 60 is to compare the status of the two counting registers 52 and 54 and to provide a positive output only when the status of the two registers 52 and 54 is not equal. The comparator circuit 60 can also be readily constructed in accordance with the state of the art; it may comprise an integrated circuit, or may be incorporated into the single microprocessor chip which comprises the logic circuit.

In a simple form, shown on FIG. 5, the comparator circuit 60 includes a plurality of EXCLUSIVE OR gates 62 with one such EXCLUSIVE OR gate 62 being connected between each one flip-flop switch 57 of the first register 52 and a corresponding flip-flop switch 57 of the second register 54. In this connection it is noted that the registers or flip-flops store the counts in the binary system, and that the value of the numbers stored is not important from the standpoint of the present invention. What is important is that the comparator circuit 60 outputs a positive signal only when the number of persons who have entered the room since the last reset does not equal the number of persons who left the room, as such counts of entries and exits are reflected in the status of the counting registers 52 and 54.

The output of the comparator circuit 60 is used in accordance with the present invention to activate a switching circuit or power drive circuit 64. The function of the switching circuit 64 is to turn a light, appliance, or other electrical device on or off. In the event the comparator circuit 60 is made up of a plurality of individual EXCLUSIVE OR gates 62, as is schematically shown on FIG. 5, then the outputs of the EXCLUSIVE OR gates 62 are inputted into an OR gate 66. In such a case, the output of the OR gate 66 can be considered the final output of the overall comparator circuit 60, which controls the switching circuit 64.

The switching circuit 64, which is also readily made in accordance with the state of the art, is most often used in accordance with the present invention as an automatic on/off switch of a lamp or lighting fixture 68. In this connection it is noted that the most frequent use of the system of the present invention is automatic control of a lamp or light 68 in a room 20. The lamp 68 is to be turned on when at least one person has entered the room, and to be turned off when all persons have left the room. The switching circuit 64 may also be used to activate an alarm 70, or some other type of electric device or appliance.

In accordance with one contemplated preferred embodiment, the system of the present invention is used to automatically control a lamp 68 and to also control an alarm 70, but only when the alarm 70 is specifically activated through a switch 72. FIG. 5 schematically shows a keyhole 74 marked ALARM on the control box 42 for a key (not shown) which is used in the hereindescribed preferred embodiment to trip the switch 72. FIG. 1 also shows that, in accordance with the preferrd embodiment, the entire system may be bypassed by using appropriate state-of-the-art circuitry, so that the light 68 can be manually turned ON or OFF by using a switch 76. A third position of the switch 76, marked AUTO on the control box 42 of FIG. 1, activates the automatic light control system of the invention.

Figure 4:
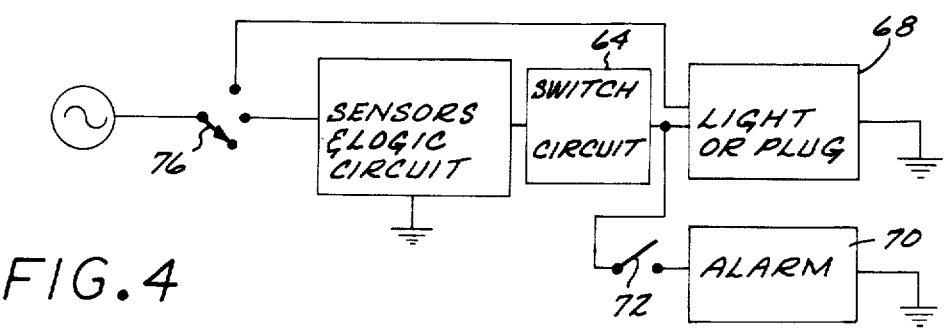
FIG. 4 is a schematic representation of the electric connection of the first preferred embodiment of the light control system of the present invention to the standard supply of power in a household.

FIG. 4 shows the basic connection of the system of the invention relative to the household power supply.

The system which has been descried above is well suited for controlling the lights in a single room or enclosure. It is contemplated in accordance with the present invention that several systems can be installed in a home or building to control the lights in the several rooms of the building. A plurality of systems in one home or building may operate independently from one another, or may have limited connection to one another. For example, the exit sensors of one doorway leading into one room, may serve as the entry sensors of the system of an adjoining room. As still another alternative, the logic circuits of several rooms may be provided together in one central location in a joint control panel for a plurality of systems.

Several further modifications in the manner of construction and utilization of the present invention may become readily apparent to those skilled in the art in light of the foregoing disclosure. Therefore, the scope of the invention should be interpreted solely from the following claims as such claims are read in light of the disclosure.

What is claimed is:

1. A system adapted for establishing whether one or more persons are present in a room, and for switching a lighting fixture or an electrical appliance on or off depending on the presence of one or more persons, the system comprising:

sensing means installed in operative association with each entryway into a room for sensing passage of a person through the entryway, the sensing means being adapted to send a first signal when a person enters through the entryway and a second signal when a person leaves through the entryway;

first counting register means connected to the sensing means for receiving the first signals sent by the sensing means and for counting and storing the number of such first signals received, thereby counting the number of persons who have entered the room;

second counting register means connected to the sensing means for receiving the second signals sent by the sensing means and for counting and storing the number of such second signals received, thereby counting the number of persons who have exited from the room;

comparator means for comparing the status of the first counting register means and the status of the second counting register means, the comparator means providing an output signal only when the status of the first and second counting register means are not equal, and switching means operatively connected with the comparator means for receiving the output signal of the comparator means and for turning the lighting fixture or appliance on or off depending on whether there is such output signal sent by the comparator means.

2. The system of claim 1 wherein the sensing means comprise a first light source and a first photocell adapted to receive light from the first light source, and a second light source and a second photocell adapted to receive light from the second light source, the first light source and first photocell being incorporated into one entryway in a position where the light of the first light source is interrupted first, and the second light source and second photocell being incorporated into the entryway in a position where the light of the second light source is interrupted second when a person enters into the room through the entryway, the first photocell outputting the first signal when the light to it is interrupted, and the second photocell outputting the second signal when the light to it is interrupted.

3. The system of claim 2 further comprising timer circuit means for inactivating the first and second counting register means for a predetermined time period after the first one of the first and second signals are received and counted.

4. The system of claim 3 wherein the timer circuit means are adapted for inactivating the first and second counting register means for approximately 0.3 to 5 seconds, said time period being adjustable at the option of an operator.

5. The system of claim 1 wherein the sensing means comprise a first wire loop creating a weak magnetic field around the entryway, the strength of the magnetic field being affected by the presence of a person in the entryway, the person acting as a core, and first means for detecting said effect on the magnetic field and for outputting the first signal, and a second wire loop creating a weak magnetic field around the entryway, the strength of the magnetic field being affected by the presence of a person in the entryway, and second means for detecting said effect on the magnetic field and for outputting the second signal, the first and second wire loops being incorporated into one entryway in positions where the magnetic field of the first loop is affected first, and the magnetic field of the second loop is affected second when a person walks into the room through the entryway.

6. The system of claim 5 further comprising timer circuit means for inactivating the first and second counting register means for a predetermined time period after the first one of the first and second signals are received and counted.

7. The system of claim 3 wherein the timer circuit means are adapted for inactivating the first and second counting register means for approximately 0.3 to 5 seconds, said time period being adjustable at the option of an operator.

8. The system of claim 1 further comprising first and second AND gates, the first AND gate being connected to the sensing means to receive the first signal as an input, the second AND gate being connected to the sensing means to receive the second signal as an input, output of the first AND gate being connected to the first counting register means, output of the second AND gate being connected to the second counting register means, the system further comprising timer means activated by the outputs of the first and second AND gates for outputting a signal for a predetermined time period after either one of the first and second signals are received and counted, and signal inverter means, the timer means being connected to the first and second AND gates to provide inputs into said AND gates through the signal inverter means, whereby the first and second AND gates have zero output for the predetermined time period.

9. The system of claim 1 wherein a lighting fixture is turned on by the system when at least one person is present in the room.

10. The system of claim 9 wherein an alarm is turned on when at least one person is present in the room.

11. A system adapted for establishing whether one or more persons are present in a room, and for switching a lighting fixture or an electrical appliance on or off depending on the presence of one or more persons, the system comprising:

first and second photoelectric sensor means incorporated into each entryway leading into the room, the first sensor means being adapted for providing as output a first electric signal when the light beam of the first sensor means is interrupted by passage of a person through the entryway, the second sensor means being adapted for providing as output a second electric signal when the light beam of the second sensor means is interrupted by passage of a person through the entryway, the first and second sensor means being mounted into the entryway in such positions that when a person enters through the entryway the light beam of the first sensor means is interrupted first, and conversely when a person exits from the room the light beam of the second sensor means is interrupted first;

first counting register means operatively connected with the first sensor means for receiving the first electric signals and for counting the number of first electric signals received from the first sensor means and for storing the number of such counts;

second counting register means operatively connected with the second sensor means for receiving the second electric signals and for counting the number of second electric signals received from the second sensor means and for storing the number of such counts;

means for providing zero inputs into the first and into the second counting register means for a predetermined time period immediately after either one of the first and second counting register means has received the output of the respective first or second sensor means;

comparator means for comparing the counts stored in the first and second counting register means and for providing a first type of output signal when the counts in the two counting register means are equal, and a second type of output signal when the counts in the two counting register means are not equal, and switching means responsive to the output of the comparator means for controlling the on or off status of the lighting fixture or electrical appliance.

12. The system of claim 11 wherein the means for providing zero inputs comprise a first AND gate connected to the first sensor means to receive as its input the output of the first sensor means, and a second AND gate connected to the second sensor means to receive as its input the output of the second sensor means, outputs of the first and second AND gates being respectively connected to the first and second counting register means, the means for providing zero inputs further comprising timer circuit means connected to and activated by the outputs of the first and second AND gates for providing for a predetermined time a zero input into both first and second AND gates after either one of the first and second AND gates has a positive output.

13. The system of claim 12 wherein the timer circuit means includes a timer circuit having a positive output only when the circuit is activated for the predetermined time period, and signal converter means connected between the timer circuit and the input side of the first and second AND gates, whereby the signal output of the timer circuit is inverted before it is inputted into the first and second AND gates.

14. The system of claim 13 wherein the timer circuit is adjustable to provide the positive output for a time period which is approximately 0.3 to 5 seconds.

15. The system of claim 14 wherein the first and second counting register means each comprise a series of flip-flop circuits, there being an equal number of flip-flop circuits in each counting register means.

16. The system of claim 15 wherein the comparator means comprise a series of EXCLUSIVE OR gates, each EXCLUSIVE OR gate being connected between one flip-flop circuit of the first counting register means and a respective flip-flop circuit of the second counting register means, each EXCLUSIVE OR providing an output only if the status of the respectively connected flip-flop circuit is not the same, the outputs of the EXCLUSIVE OR gates controlling the switching means.

17. The system of claim 16 wherein the outputs of the EXCLUSIVE OR gates are inputted into an OR gate, and wherein the output of the OR gate controls the switch means.

18. The system of claim 17 wherein the system switches on a lighting fixture whenever the output of one of the EXCLUSIVE OR gates is positive.

19. The system of claim 17 wherein the system switches on an alarm whenever the output of one of the EXCLUSIVE OR gates is positive.

20. A system adapted for establishing whether one or more persons are present in a room, and for switching a lighting fixture or an electrical appliance on or off depending on the presence of one or more persons, the system comprising:

first and second photoelectric sensor means incorporated into each entryway leading into the room, the first sensor means being adapted for providing as output a first electric signal when the light beam of the first sensor means is interrupted by passage of a person through the entryway, the second sensor means being adapted for providing as output a second electric signal when the light beam of the second sensor means is interrupted by passage of a person through the entryway, the first and second sensor means being mounted into the entryway in such positions that when a person enters through the entryway the light beam of the first sensor means is interrupted first, and conversely when a person exits from the room the light beam of the second sensor means is interrupted first;

a first AND gate connected to the first sensor means to receive as its input the output of the first sensor means, and a second AND gate connected to the second sensor means to receive as its input the output of the second sensor means;

first counting register means receiving as input the output of the first AND gate for counting the number of first electric signals received from the first sensor means and for storing the number of such counts;

second counting register means receiving as input the output of the second AND gate for counting the number of second electric signals received from the second sensor means and for storing the number of such counts;

timer circuit means connected to and activated by the outputs of the first and second AND gates for providing for a predetermined time a zero input into both first and second AND gates after either one of the first and second AND gates has a positive output, the input from the timer circuit means into the first and second AND gates being the second input into the respective AND gates in addition to the input received respectively from the first and second sensor means;

comparator means for comparing the counts stored in the first and second counting register means and for providing a first type of output signal when the counts in the two counting register means are equal, and a second type of output signal when the counts in the two counting register means are not equal, and switching means responsive to the output of the comparator means for controlling the on or off status of the lighting fixture or electrical appliance.

21. The system of claim 20 wherein the timer circuit means comprise a timer circuit which normally provides no output and which provides a positive output for the predetermined time, and a signal converter through which the output of the timer circuit is inputted into the first and second AND gates, whereby the input from the timer circuit means into the first and second AND gates is normally positive, but disappears for the predetermined time.

* * * * *

UNITED STATES PATENT AND TRADEMARK OFFICE
CERTIFICATE OF CORRECTION

PATENT NO. : 4,719,363

DATED : January 12, 1988

INVENTOR(S) : DOUGLAS L. GALLAGHER

It is certified that error appears in the above-identified patent and that said Letters Patent is hereby corrected as shown below:

Column 1, line 23, delete "senors" and insert --sensors--.

Column 6, line 48, delete the word "preferrd" and insert --preferred--.

Signed and Sealed this

Fifth Day of July, 1988

Attest:

DONALD J. QUIGG

Attesting Officer

Commissioner of Patents and Trademarks